United States Patent [19]

Kaneda et al.

[11] 4,057,850
[45] Nov. 8, 1977

[54] PROCESSING LINK CONTROL DEVICE FOR A DATA PROCESSING SYSTEM PROCESSING DATA BY EXECUTING A MAIN ROUTINE AND A SUB-ROUTINE

[75] Inventors: Saburo Kaneda, Yokohama; Koichi Tokura, Ichikawa, both of Japan

[73] Assignee: Fujitsu Limited, Kawasaki, Japan

[21] Appl. No.: 634,401

[22] Filed: Nov. 24, 1975

[30] Foreign Application Priority Data

Nov. 26, 1974 Japan .................. 49-137361

[51] Int. Cl.$^2$ .......................... G06F 9/12; G06F 9/20
[52] U.S. Cl. .................................................. 364/200
[58] Field of Search .................... 340/172.5; 445/1; 364/200, 900

[56] References Cited

U.S. PATENT DOCUMENTS

| | | | |
|---|---|---|---|
| 3,153,225 | 10/1964 | Merner et al. | 340/172.5 |
| 3,292,155 | 12/1966 | Neilson | 340/172.5 |
| 3,348,211 | 10/1967 | Ghiron | 340/172.5 |
| 3,475,732 | 10/1969 | Avsan et al. | 340/172.5 |
| 3,480,917 | 11/1969 | Day | 340/172.5 |
| 3,513,446 | 5/1970 | Cotton et al. | 340/172.5 |
| 3,571,804 | 3/1971 | Hemdal et al. | 340/172.5 |
| 3,599,176 | 8/1971 | Cordero, Jr. et al. | 340/172.5 |
| 3,713,108 | 1/1973 | Edstrom et al. | 340/172.5 |

*Primary Examiner*—Melvin B. Chapnick
*Attorney, Agent, or Firm*—Daniel Jay Tick

[57] ABSTRACT

A data register storing an instruction code field, modification bits, a control bit field, condition branching fields and the next address in corresponding areas thereof is coupled to a control memory via a plurality of AND gates. A branch determination circuit for determining an instruction for selecting in accordance with a machine state, a single micro-instruction of four which are read out from the control memory, is connected to each AND gate for controlling them. The branch determination circuit is connected to the data register's condition branching field areas. A save-restore address register storing the address and branch address bits in corresponding areas thereof is coupled to the data register's next address area, the branch determination circuit, the control memory, from a first branch address bit area thereof to each AND gate for controlling them and is connected to a first bit modification control circuit. The second branch address bit area thereof is coupled to each AND gate for controlling them and is connected to a second bit modification control circuit. A save memory for storing the return address is coupled to the save-restore address register's address area and to the first and second bit modification control circuits. The save memory is coupled to the save-restore address register's address area whereby any of a plurality of return addresses is designated by selection of the modification bit in the branch and link instruction and access is provided simultaneously for four word address positions of the control memory by the next address, four micro-instructions are read out from the control memory by the next address and only one of the four micro-instructions is selected by the condition branching fields via the AND gates and set in the data register.

3 Claims, 5 Drawing Figures

PROCESSING LINK CONTROL DEVICE FOR A DATA PROCESSING SYSTEM PROCESSING DATA BY EXECUTING A MAIN ROUTINE AND A SUB-ROUTINE

BACKGROUND OF THE INVENTION

The present invention relates to a processing link control device. More particularly, the invention relates to a processing link control device in a data processing system processing data by executing a main routine and a sub-routine.

Heretofore, as a method in a micro-program computer, micro-instruction, hereinafter referred to as BAL, for Branch and Link, has been widely introduced for branching from the main routine to a sub-routine. The instruction is used to save the return address, which is used for returning to the main routine when branching from the main routine to the sub-routine. Thus, the main routine may be started again by returning the address being saved with another instruction at the output of the sub-routine to the address register when returning from the sub-routine to the main routine. Conventionally, however, the return address specified by the instruction has been determined on a one to one basis. Therefore, there is a limitation on the allocation of the address location of the micro-instruction within the control memory. As a result, it becomes difficult to effectively use the control memory. This results in uneconomical use of the memory.

The principal object of the invention is to provide a processing link control system for data processing equipment which provides efficient and economical use of the memory thereof.

An object of the invention is to provide a processing link control system for data processing equipment, which processing link control system is of simple structure and inexpensive in manufacture.

Another object of the invention is to provide a processing line control system for data processing equipment, which processing link control system functions efficiently, effectively and reliably to select one of a plurality of return addresses by instruction.

BRIEF SUMMARY OF THE INVENTION

In accordance with the invention, in a processing link control device for a data processing system, control is provided such that the address, via which the main routine is returned to a later time, is saved when the execution is branched from the processing main routine to a sub-routine. The return address is not determined on a one to one basis. Instead, a plurality of return addresses may be selected. Simultaneously, only one address of the plurality of addresses may be selected by instruction.

The processing link control device of the invention is for a data processing system which processes data by executing the main routine and sub-routine. A modification bit field for instructing the modification of return address is provided in the instruction. This saves the return address when the execution branches from the main routine to a sub-routine, in order to return to the main routine. Simultaneously, modification means modifies the specified bit of the return address in accordance with the instruction from the modification bit field. Thus, a return to the main routine is provided via the return address obtained by the modification means.

The processing link control device of the invention functions in two ways. In one case, after the address of the branch instruction itself is modified by modification bits MA and MB included in said branch instruction, the modified address is saved in a memory. In the other case, the branch instruction itself is saved in the save memory and the modification bits MA and MB included in the branch instruction are saved in the other memories. The saved address and the saved modification bits MA and MB are read out when returning from a sub-routine to the main routine and the saved address is used after modification by the modification bits MA and MB.

In accordance with the invention, the processing link control device in a data processing system for modifying a conditional branch instruction address for a return address from a sub-routine to a main routine, comprises a control memory having an address input and a plurality of outputs. Each of a plurality of AND gates has a first input, a second input and an output. The first inputs of the AND gates are connected to outputs of the control memory. A data register has an input coupled to the outputs of the AND gates. The data register stores an instruction code field, modification bits field, a control bit field, condition branching fields and the next address in corresponding areas thereof. A branch determination circuit determines an instruction for selecting in accordance with a machine state, a single micro-instruction of four which are read out from the control memory, said branch determination circuit being connected to the second input of each of the AND gates for controlling said gates, said branch determination circuit having inputs connected to the condition branching field areas of the data register, and an output. A first bit modification control circuit has a pair of inputs and an output. An input of the first bit modification control circuit is connected to the modification bits field of the data register. A second bit modification control circuit has a pair of inputs and an output. An input of the second bit modification control circuit is connected to the modification bits field of the data register. A save-restore address register stores the address and branch address bits in corresponding areas thereof. The save-restore address register has input means coupled to the next address area of the data register and input means coupled to the output of the branch determination circuit, output means coupled to the address input of the control memory, output means from a first branch address bit area thereof coupled to the second input of each of the AND gates for controlling said gates and connected to the other input of the first bit modification control circuit, and output means from a second branch address bit area thereof coupled to the second input of each of the AND gates for controlling said gates and connected to the other input of the second bit modification control circuit. A save memory stores the return address. The save memory has input means coupled to the address area of the save-restore address register and to the outputs of the first and second bit modification control circuits, and output means coupled to the address area of the save-restore address register, said address area including the branch address bits, whereby any of a plurality of return addresses is designated by selection of the modification bit in the branch and link instruction and access is provided simultaneously for four word address positions of the control memory by the next address, four micro-instructions are read out from the control memory by the next address and only one of the four micro-instructions is selected by the condition branching fields via the AND gates and set in the data register.

The first bit modification control circuit comprises a first exclusive OR gate. The second bit modification control circuit comprises a second exclusive OR gate.

A decoder has an input coupled to the instruction code field area of the data register, and an input coupled to the control bit field area of the data register. The decoder decodes the contents of the instruction code field and the control bit field set in the data register and utilizes said contents as a control signal.

BRIEF DESCRIPTION OF THE DRAWINGS:

In order that the invention may be readily carried into effect, it will now be described with reference to the accompanying drawings, wherein.

In the FIGS., the same components are identified by the same reference numerals.

DETAILED DESCRIPTION OF THE INVENTION:

In the example of the invention hereinafter described, four micro-instructions are read out simultaneously, and only one is selected therefrom.

Figure 1:
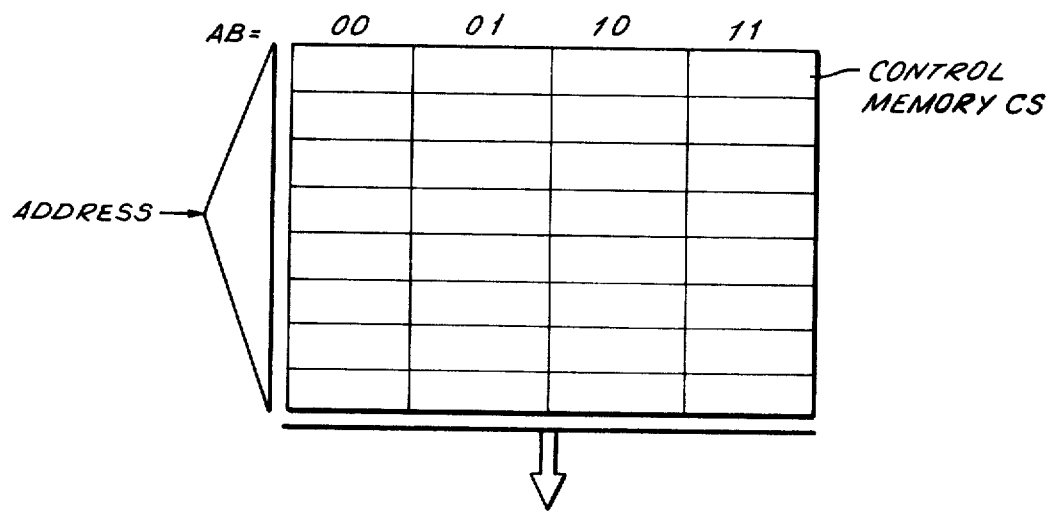
FIG. 1 is a view of an embodiment of the control memory of the processing link control device of the invention.
Figure 2:
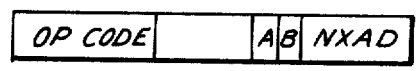
FIG. 2 is a schematic diagram of an embodiment of a micro-instruction of the data processing system of the invention.

FIG. 1 shows an example of the control memory CS used in the processing link control device of the invention. When a certain address is provided, a corresponding horizontal row, of four words, is read out simultaneously. Each of the four words is an independent single micro-instruction, as shown in FIG. 2. Which micro-instruction must be used is determined by the completion of the previous micro-instruction. The micro-instruction is then selected by operation of a plurality of gates and is used after being stored in a data register, as hereinafter described. In other words, in the prior art, when a certain micro-instruction is set at the data register, since said instruction includes the next address NXAD, as shown in FIG. 2, access to the four words in said address is had immediately. The access operation is undertaken in parallel with the execution of the present micro-instruction.

The micro-instruction to be executed next is determined regardless of the execution result of the existing micro-instruction. Thus, when the existing micro-instruction is completed, at which time readout from the control memory CS is completed, only one of the four instructions read out is selected, using information A and B shown in FIG. 2. The selected instruction is then set in the data register as the next micro-instruction. Furthermore, if, in the prior art, the next micro-instruction must be selected from the several instructions by the execution result of the existing micro-instruction, an appropriate instruction may be selected by modifying the information A and B according to the execution result of the existing instruction.

It is anticipated, however, that the several micro-instructions subject to the selection should be within the four words of a horizontal row. In accordance with this method, there is an advantage that predetermination or preselection of the instruction is possible, even at the condition branch. Furthermore, when there is branching to the sub-routine when the BAL instruction appears in the main routine, it becomes necessary to save the return address in order to return the instruction of the main routine after completion of the sub-routine.

The method of the prior art for obtaining the return address is hereinafter described. In the BAL instruction, the next address NXAD is not the return address, but the branched address. In other words, the return address cannot be instructed from the BAL instruction. For this reason, in the conventional method, the word position of the BAL instruction and return destination are fixed. Thus, for example, the BAL instruction is determined to the word position of AB=OO as shown in FIG. 1, while the instruction of the return destination for the BAL instruction to the word position of AB=10 is provided in the same row.

In such method, if the address which provides the BAL instruction, that is, only the address NXAD of the micro-instruction next-preceding the BAL instruction, hereinafter referred as the prior BAL instruction, is saved, the return destination may be specified to the word position of AB=10 of said address, thus simplifying the processing and hardware configuration. However, if the word positions of the BAL instruction and micro-instruction of the return destination are fixed as hereinbefore specified, the address allocation for the micro-instruction, that is, which instruction should be stored in which position in the control memory, becomes difficult. In some cases, since the word position of AB=01 of 11 of the address including the BAL instruction cannot be used, the memory utilizing efficiency decreases.

An object of the invention is to permit the storage of the BAL instruction and micro-instruction of the return destination in any word position if it is in the same row. For this purpose, information for modifying the address providing the BAL instruction, that is, the next address NXAD of the prior BAL instruction, and information AB, to be modified, are provided in the BAL instruction. The address, including the information A and B, providing the BAL instruction, is further modified and saved when saving the return address.

Figure 3:
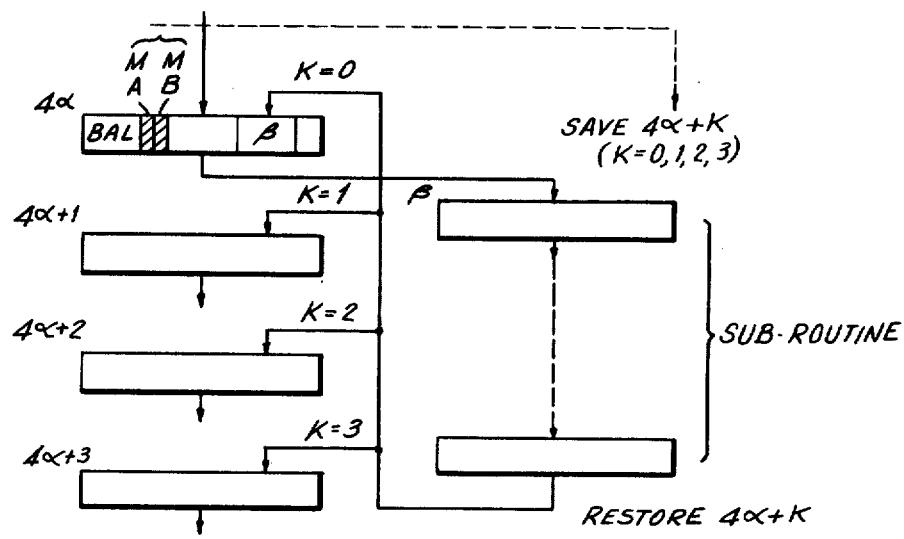
FIG. 3 is a schematic diagram for explaining the process of saving and restoring the return address in the processing link control device of the invention.

As shown in FIG. 3, it is assumed that the instruction which has been stored in the address 4α is set in the data register, and that such instruction is the BAL instruction. The BAL instruction is provided with the jump address β in the next address designation field, and the sub-routine beginning from the address β is thereby executed. At such time, the return address for returning to the main routine at a later time is saved. More particularly, in the present invention, the address provided by 4α + K, where K=0, 1, 2, 3, is saved as the return address. Here, 4α is the address in the main routine which said BAL instruction stores, and K is determined as any of 0, 1, 2, 3 by the modification bits MA and MB shown in FIGS. 3 and 4.

By designating the modification bits MA and MB in the BAL instruction, any one of the return addresses 4α, 4α + 1, 4α + 2, 4α + 3 may be designated.

Figure 4:
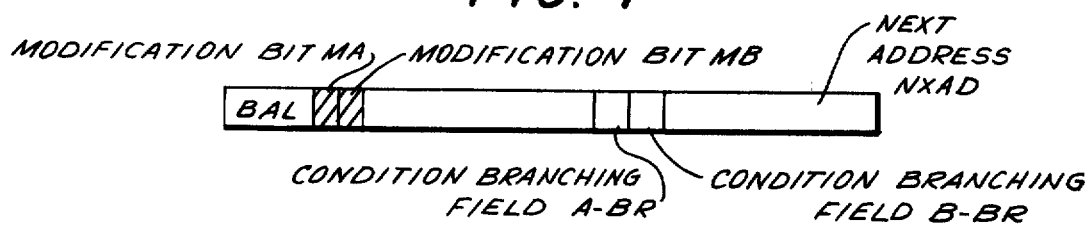
FIG. 4 is a schematic diagram of an embodiment of a BAL instruction used in the processing link control device of the invention.

FIG. 4 shows an embodiment of the format of the BAL instruction, wherein MA and MB are the modification bits or modification bit fields provided in the system of the invention, NXAD is the next address or next address designation field, and each of A-BR and B-BR is a condition branching field for selecting only one micro-instruction from four read out simultaneously, according to information of the data processing system.

Figure 5:
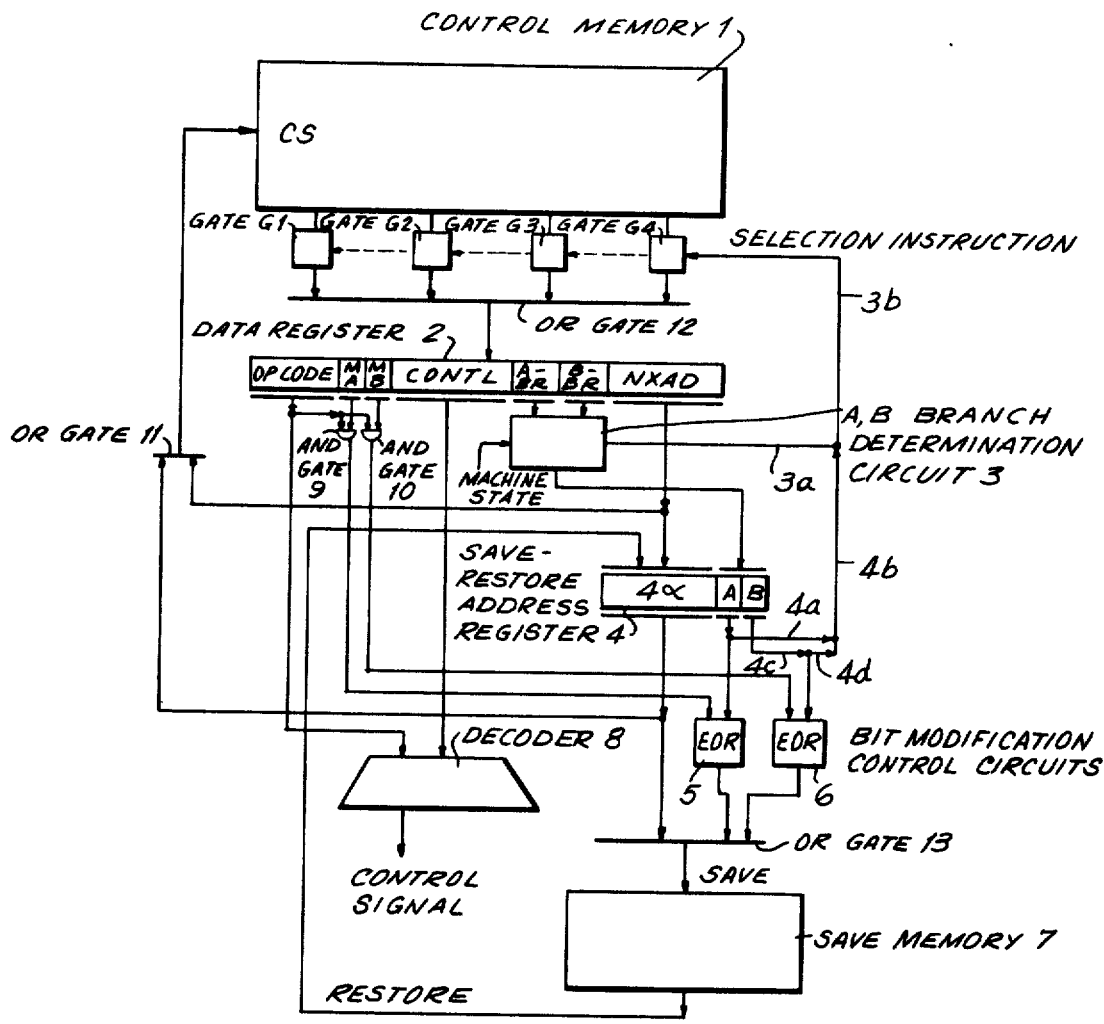
FIG. 5 is a block diagram of an embodiment of the processing link control device of the invention.

A process for executing the process shown in FIG. 1, when the BAL instruction shown in FIG. 2 is set in the data register in the main routine, is hereinafter explained with reference to FIG. 5. FIG. 5 is a block diagram of an embodiment of the processing link control system of the invention. In FIG. 5, a control memory 1 has a plurality of outputs connected to inputs of an OR gate 12 via gates G1, G2, G3 and G4, respectively. The output of the OR gate 12 is connected to the input of a data register 2 in which a selected single micro-instruction is set. The data register 2 has specified storage areas for the instruction code field OP CODE, the modification bit MA, the modification bit MB, the control field CONTL, the condition branching field A-BR, the condition branching field B-BR and the next address NXAD.

Readout from the condition branching fields A-BR and B-BR areas of the data register 2 is supplied to inputs of an A, B branch determination circuit 3. The branch determination circuit 3 determines the instruction for selecting, in accordance with the machine state, a single micro-instruction of four which are simultaneously read out from the control memory 1. The A, B branch determination circuit 3 controls the gates G1, G2, G3 and G4 by selectively switching one of said gates to its conductive condition via leads 3a and 3b.

The branch determination circuit 3 is utilized in known techniques and may comprise any suitable circuitry for achieving the desired results. A suitable branch determination circuit is fully disclosed in the U.S. Pat. No. 3,728,686. In U.S. Pat. No. 3,728,686, part of the EO EXECUTION LOGIC functions as a branch determination circuit.

Readout from the next address NXAD area of the data register 2 is supplied to a first read-in of a save-restore address register 4 and to an input of an OR gate 11. The output of the A, B branch determination circuit 3 is connected to a second read-in of the save-restore address register 4. The save-restore address register 4 has specified storage areas for the address 4a, the branch address bit A and the branch address bit B. The first read-in is to the area of the address 4a and the second read-in is to the areas of the branch address bits A and B. An address is set in the save-restore address register 4 when there is address saving or address restoring.

Readout from the address 4a area of the save-restore address register 4 is supplied to an input of an OR gate 13 and to the other input of the OR gate 11, the output of which is connected to the input of the control memory 1. Readout from the branch address bit A area of the save-restore address register 4 controls the gates G1, G2, G3, and G4 via leads 4a, 4b and 3b by selectively switching one of said gates to its conductive condition and is connected to a first input of a bit modification control circuit 5. Readout from the branch address bit B area of the save-restore address register 4 controls the gates G1, G2, G3 and G4 via leads 4c, 4d, 4b and 3b by selectively switching one of said gates to its conductive condition and is connected to a first input of a bit modification control circuit 6. Each of the bit modification control circuits consists of an exclusive OR circuit.

Readout from the instruction code field OP CODE area of the data register 2 is supplied to a first input of an AND gate 9, a first input of an AND gate 10, and to a first input of a decoder 8. Readout from the modification bit MA area of the data register 2 is supplied to the second input of the AND gate 9. Readout from the modification bit MB area of the data register 2 is supplied to the second input of the AND gate 10. Readout from the control bit field CONTL area of the data register 2 is supplied to the second input of the decoder 8. The decoder 8 decodes the contents of the instruction code field OP CODE of the micro-instruction and control bit field CONTL set in the data register 2. If a usual micro-instruction, not the BAL instruction, is set in the data register 2, the contents of the instruction code field OP CODE and control bit field CONTL are decoded by the decoder 8 and utilized as signals. The control signals provided by the decoder 8 are utilized to control various circuits. The control signals provided by the decoder 8 may thus be supplied as gate inputs of an adder, a multiplier and an interface controller in order to control these circuits.

The output of the AND gate 9 is connected to the second input of the bit modification control circuit 5. The output of the AND gate 10 is connected to the second input of the bit modification control circuit 6. The output of the OR gate 13 is connected to the input of a save memory 7, which stores the return address. The output of the save memory 7 is connected to the first read-in of the save-restore address register 4. The save memory 7 may comprise a register.

The next address designation field NXAD of the instruction designates the next address to be accessed. However, its content is fed to the OR gate 11 for accessing the control memory 1. At such time, the content of the condition branching fields A-BR and B-BR is fed to the A, B branch determination circuit 3. The branch determination circuit 3 is capable of supplying the selection instruction to the gates G1 to G4. In such cases, access is provided simultaneously for four word address positions of the control memory 1 by the next address NXAD. In other words, as hereinbefore specified, four micro-instructions are read out from the control memory 1 by the next address NXAD, and only one of them is selected by the selection instruction and set in the data register 2. Processing proceeds thereby.

When the BAL instruction is set, as shown in FIG. 5, the heading address β of the sub-routine is written in the next address designation field NXAD, as shown in FIG. 3. The initial instruction of the sub-routine is then read out by the address β. Processing of the sub-routine is thereby continued.

In FIG. 5, the configuration of the micro-instruction concerning the preselection or predetermination processing is omitted for simplification of the description. However, the PRIOR BAL instruction, which is set in the data register 2 before the BAL instruction is set in said data register, has the address 4a (FIG. 3) in its next address designation field NXAD in order to set the BAL instruction in the data register 2. Additionally, the content 4a is set in the save-restore address register 4. Furthermore, the A, B branch address bits A and B, which are the A, B branch address bits which have selected the BAL instruction, determined by the condition branching fields A-BR and B-BR of the prior BAL instruction and the machine state, are set as the lower two bits of the save-restore address register 4. That is, when the BAL instruction is set in the data register 2, the save address determined by the PRIOR BAL instruction is set in the save-restore address register 4.

As hereinbefore mentioned, the modification bits MA and MB are designated in the BAL instruction and they are fed to the bit modification control circuits or exclusive OR circuit 5 and 6 via the AND gates 9 and 10 under the condition that said instruction is the BAL instruction. When the modification bits MA and MB are "0" and "0", the A, B branch address bits A and B are directly saved. When the modification bits MA and MB are "0" and "1", the branch address bit A is directly saved and the branch address bit B is inversely saved. When the modification bits MA and MB are "1" and "0", the branch address bit A is inversely saved and the branch address bit B is directly saved. When the modification bits MA and MB are "1" and "1", both branch address bits A and B are inversely saved.

When AB = "0, 0" is assumed for A, B of the address for the BAL instruction, for example, AB = "0, 0" is set in the save-restore address register 4. If it is desired to make the return address AB = "0, 1", this may be done by making the modification bits MA, MB "0, 1". In addition, AB = "0, 1" of the address of the BAL instruction is assumed. If it is desired to make the return address AB = "1, 1", this may be realized by making the modification bits MA, MB "1, 0". It is also possible to store the BAL instruction as AB = "1, 1" and to make the return address AB = "0, 0" in the same row. In this case, the modification bits MA, MB have to be made "1, 1". That is, in FIG. 3, $4\alpha$ is shown as the address of the BAL instruction. That is, AB = "0, 0". Generally, however, $4\alpha + K$ (K = 1, 2, 3), that is, AB $\neq$ "0, 0" is permissible. In this case, it is permissible to provide a smaller AB of the return address than that of the BAL instruction.

As hereinbefore mentioned, the address of the BAL instruction is modified by the modification bits MA and MB, and then saved. Processing of the sub-routine continues in this condition, and when it reaches the outlet of the sub-routine, the return address which is one of four words, $4\alpha + K$, is read out from the save memory 7 and set in the save-restore address register 4 for restoration. The content of the save-restore address register 4, which is $4\alpha$ in the return address, is then used for access to the control memory 1 via the OR circuit 11. In addition, the content of the save-restore address register 4, which is K in the return address, is used as the selection instruction of the gates G1 to G4, as shown by the leads $4a$, $4c$, $4d$ and $4b$. In other words, as shown in FIG. 1, instructions stored in the addresses $4\alpha$, $4\alpha + 1$, $4\alpha + 2$, $4\alpha + 3$ are read out from the control memory 1, and only one of them is selected by the gates G1 to G4 and set in the data register 2.

In the foregoing description, the address is modified before saving, but it is certainly possible to modify the address at the time of restoring. In such case, it is advisable to hold the modification bits MA and MB in the BAL instruction by suitable means such as, for example, a flip flop circuit.

Furthermore, in the foregoing description, only information A, B is modified. Generally, however, it is possible to modify any part of the bit in the save-restore address register 4. In many cases, the return address is provided around the BAL instruction, so that the aforedescribed method is just suitable. It is uneconomical to increase the number of bits of the modification bits MA, MB too much, since they cannot be used efficiently.

The processing link control system of the invention may be adapted to a system other than than including the next address in the instruction. Thus, for example, an instruction counter may be provided and the address may be provided by permitting the counter to advance one step for each instruction.

In accordance with the invention, as hereinbefore mentioned, it is possible to designate any one of $4\alpha$, $4\alpha + 1$, $4\alpha + 2$, $4\alpha + 3$ as the return address by designating the modification bit MA, MB in the BAL instruction. The allocation of the address location of the microinstruction in the control memory 1 is thus facilitated and made easy, with excellent efficiency. The control memory 1 is also effectively used.

While the invention has been described by means of a specific example and in a specific embodiment, we do not wish to be limited thereto, for obvious modifications will occur to those skilled in the art without departing from the spirit and scope of the invention.

We claim:

1. A processing link control device in a data processing system for modifying a conditional branch instruction address for a return address from a sub-routine to a main routine, said processing link control device comprising
   a control memory having an address input and a plurality of outputs;
   a plurality of AND gates each having a first input, a second input and an output, the first inputs of the AND gates being connected to the outputs of the control memory;
   a data register having an input coupled to the outputs of the AND gates, said data register storing an instruction code field, modification bits field, a control bit field, condition branching fields and the next address in corresponding areas thereof;
   a branch determination circuit determining an instruction for selecting in accordance with a machine state, a single micro-instruction of four which are read out from the control memory, said branch determination circuit being connected to the second input of each of the AND gates for controlling said gates, said branch determination circuit having inputs connected to the condition branching field areas of the data register, and an output;
   a first bit modification control circuit having a pair of inputs and an output, an input of the first bit modification control circuit being connected to the modification bits field of the data register;
   a second bit modification control circuit having a pair of inputs and an output, an input of the second bit modification control circuit being connected to the modification bits field of the data register;
   a save-restore address register storing the address and branch address bits in corresponding areas thereof, said save-restore address register having input means coupled to the next address area of the data register and input means coupled to the output of the branch determination circuit, output means coupled to the address input of the control memory, output means from a first branch address bit area thereof coupled to the second input of each of the AND gates for controlling said gates and connected to the other input of the first bit modification control circuit, and output means from a second branch address bit area thereof coupled to the second input of each of the AND gates for controlling said gates and connected to the other input of the second bit modification control circuit; and a save memory for storing the return address, said save memory having input means coupled to the address area of the save-restore address register and to the outputs of the first and second bit modification control circuits, and output means coupled to the address area of the save-restore address register, said address area including the branch address bits, whereby any of a plurality of return addresses is designated by selection of the modification bits in the branch and link instruction and access is provided simultaneously for four word address positions of the control memory by the next address, four micro-instructions are read out from the control memory by the next address and only one of the four micro-instructions is selected by the condition branching fields via the AND gates and set in the data register.

2. A processing link control device as claimed in claim 1, wherein the first bit modification control circuit comprises a first exclusive OR gate and the second bit modification control circuit comprises a second exclusive OR gate.

3. A processing link control device as claimed in claim 1, further comprising a decoder having an input coupled to the instruction code field area of the data register, and an input coupled to the control bit field area of the data register, said decoder decoding the contents of the instruction code field and the control bit field set in the data register and utilizing said contents as a control signal.

* * * * *